United States Patent
Enohara et al.

(10) Patent No.: US 9,841,930 B2
(45) Date of Patent: Dec. 12, 2017

(54) STORAGE CONTROL APPARATUS AND STORAGE CONTROL METHOD

(71) Applicant: FUJITSU LIMITED, Kawasaki-shi, Kanagawa (JP)

(72) Inventors: Katsuo Enohara, Kawaguchi (JP); Tetsuya Kinoshita, Nagano (JP); Takaaki Yamato, Nagano (JP); Takashi Murayama, Nagano (JP); Nobuyuki Hirashima, Nagano (JP); Fumio Matsuo, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 14/308,750

(22) Filed: Jun. 19, 2014

(65) Prior Publication Data

US 2015/0012697 A1 Jan. 8, 2015

(30) Foreign Application Priority Data

Jul. 5, 2013 (JP) .................. 2013-141599

(51) Int. Cl.
*G06F 12/00* (2006.01)
*G06F 3/06* (2006.01)
*G06F 11/14* (2006.01)

(52) U.S. Cl.
CPC .......... *G06F 3/0686* (2013.01); *G06F 3/0613* (2013.01); *G06F 3/0647* (2013.01); *G06F 3/0682* (2013.01); *G06F 11/1458* (2013.01)

(58) Field of Classification Search
CPC ................. G06F 3/0682; G06F 3/0686; G06F 11/1458–11/1469

(Continued)

(56) References Cited

U.S. PATENT DOCUMENTS 6,816,941 B1 * 11/2004 Carlson ................. G06F 3/0607 711/111
2004/0243745 A1 * 12/2004 Bolt ........................ G06F 3/061 710/68

(Continued)

FOREIGN PATENT DOCUMENTS

JP 2005-99971 4/2005
JP 2005-202495 7/2005

(Continued)

OTHER PUBLICATIONS

Office Action issued by the Japanese Patent Office dated Feb. 7, 2017 in corresponding Japanese patent application No. 2013-141599.

*Primary Examiner* — Prasith Thammavong
(74) *Attorney, Agent, or Firm* — Staas & Halsey LLP

(57) ABSTRACT

A storage control apparatus includes a processor. The processor is configured to store, during a normal operation mode, first data as a first logical volume in a storage section of a first virtual storage device. The first data is transmitted and received between a first host device and a physical storage device. The physical storage device stores data in a physical volume. The first virtual storage device is connected to the physical storage device during the normal operation mode. The processor is configured to serve, during a data migration mode, as a pseudo host device connected to a second virtual storage device. The pseudo host device accesses the second virtual storage device to read out second data of a second logical volume stored in the second virtual storage device. The first virtual storage device is connected to the second virtual storage device during the data migration mode.

10 Claims, 15 Drawing Sheets

(58) Field of Classification Search
USPC .......................................................... 711/111
See application file for complete search history.

(56) References Cited

U.S. PATENT DOCUMENTS

| | | |
|---|---|---|
| 2005/0154849 A1 | 7/2005 | Watanabe |
| 2005/0256999 A1* | 11/2005 | Kishi ................... G06F 3/0607 711/111 |
| 2006/0212625 A1* | 9/2006 | Nakagawa ............ G06F 3/0608 710/68 |
| 2007/0239803 A1 | 10/2007 | Mimatsu |
| 2008/0114932 A1 | 5/2008 | Kobayashi |
| 2009/0100223 A1* | 4/2009 | Murayama ............ G06F 3/0605 711/114 |
| 2010/0185813 A1 | 7/2010 | Muroyama |
| 2011/0153965 A1* | 6/2011 | Haustein ............... G06F 3/0614 711/162 |
| 2014/0189232 A1 | 7/2014 | Enohara et al. |

FOREIGN PATENT DOCUMENTS

| | | |
|---|---|---|
| JP | 2007-265403 | 10/2007 |
| JP | 2008-123444 | 5/2008 |
| WO | WO 2009/040954 | 4/2009 |
| WO | 2013/046342 A1 | 4/2013 |

* cited by examiner

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2013-141599, filed on Jul. 5, 2013, the entire contents of which are incorporated herein by reference.

FIELD

The embodiments discussed herein are related to a storage control apparatus and a storage control method.

BACKGROUND

In recent years, storage systems which include a host device, a tape library device, and a virtual tape device have been used. In such a system, the virtual tape device is provided between the host device and the tape library device and stores therein, as a virtual tape volume (logical volume), data transmitted and received between the host device and the tape library device. As described above, the virtual tape device places data as a logical volume on a random access medium (for example, a tape volume cache; TVC) such as a magnetic disk device or the like, and thus, virtually performs tape operations on the magnetic disk medium. This allows the virtual tape device to omit mechanical operations, such as tape mount, load/unload, and the like, thus realizing high-speed operations.

In the above-described storage system, as the expiration date of support for the virtual tape device approaches, a system user (customer) purchases a new virtual tape device and performs a data migration operation to migrate data from the old virtual tape device to the new virtual tape device.

As for existing data migration, for example, an old virtual tape device and a new virtual tape device are provided together for a host device and desired data is moved (copied) from the old virtual tape device to the new virtual tape device via the host device, thus performing data migration (see, for example, FIG. 10).

As another example, existing data migration is performed, by using an export/import function, which is one of functions of the virtual tape device. That is, desired data which exists in the old virtual tape device is written on a tape which is a physical volume by an export function of the old virtual tape device. Thereafter, the tape on which the desired data is written is moved to a tape library which belongs to the new virtual tape device and the desired data is read from the tape which has been moved into the new virtual tape device by an import function of the new virtual tape device, thus performing data migration.

Related techniques are disclosed, for example, in Japanese Laid-open Patent Publication No. 2007-265403 and International Publication Pamphlet No. WO2009/040954.

However, when desired data is copied from the old virtual tape device to the new virtual tape device via the host device, data stored in the old virtual tape device is read and is temporarily stored in the host device, and then, the stored data is written to the new virtual tape device. Therefore, a problem arises in which it takes a long time (from several days to several weeks) to complete moving of all of the desired data and enable normal operations of the storage system.

When data migration is performed using the export/import function, data writing to a tape is performed in the old virtual tape device and data reading from a tape is performed in the new virtual tape device. Therefore, a problem arises in which it takes a long time (from several days to several weeks) to complete moving of all of the desired data and enable normal operations of the storage system.

SUMMARY

According to an aspect of the present invention, provided is a storage control apparatus including a processor. The processor is configured to store, during a normal operation mode, first data as a first logical volume in a storage section of a first virtual storage device. The first data is transmitted and received between a first host device and a physical storage device. The physical storage device stores data in a physical volume. The first virtual storage device is connected to the physical storage device during the normal operation mode. The processor is configured to serve, during a data migration mode, as a pseudo host device connected to a second virtual storage device. The pseudo host device accesses the second virtual storage device to read out second data of a second logical volume stored in the second virtual storage device. The first virtual storage device is connected to the second virtual storage device during the data migration mode. The processor is configured to store the second data of the second logical volume in the storage section.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
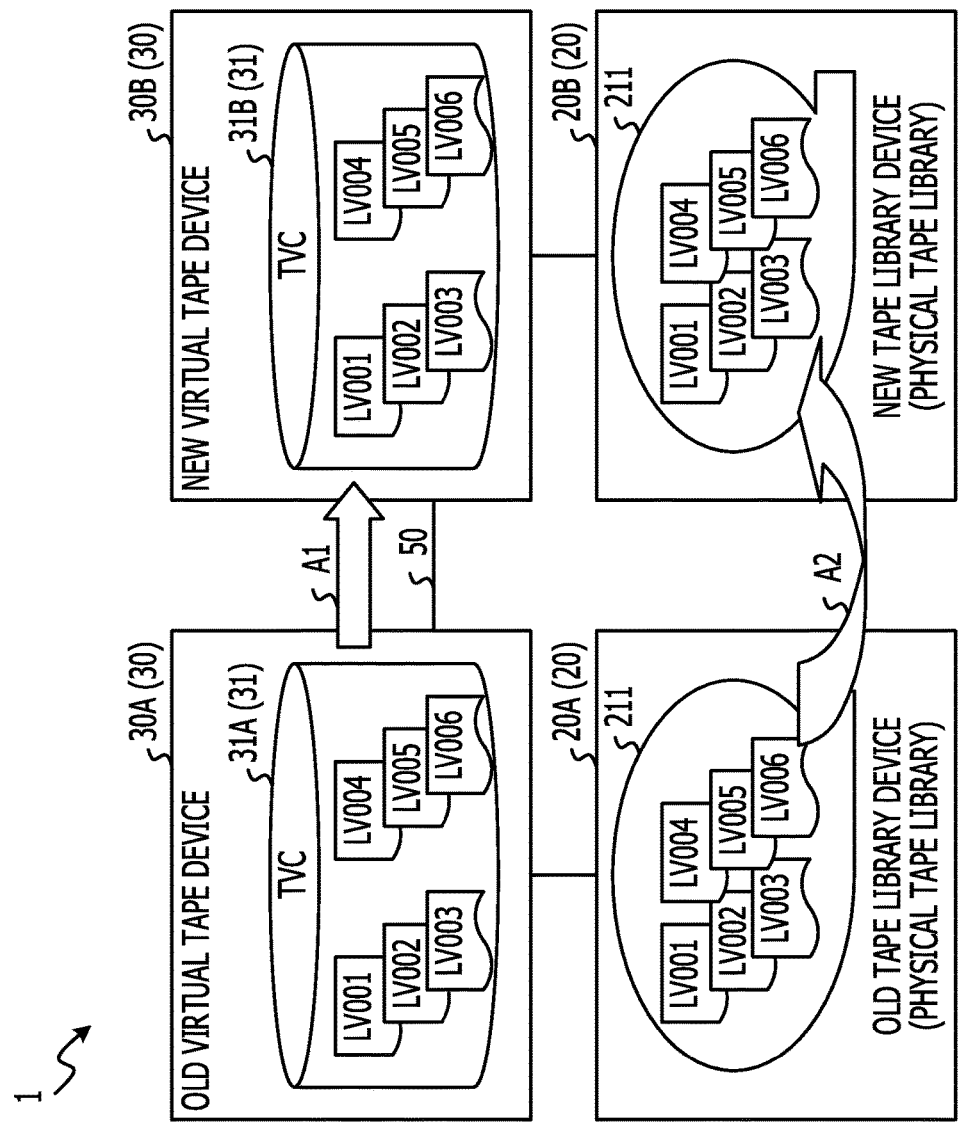
FIG. 1 is a diagram illustrating a storage control method executed when a virtual tape device according to an embodiment is changed.

Embodiments will be described below with reference to the accompanying drawings.

A storage system including a virtual tape device will be described with reference to a block diagram illustrated in FIG. 12. The storage system illustrated in FIG. 12 includes a global server (host device; HOST) 10, a tape library device (LIB) 20, and a virtual tape device 30. The host device 10 is a host computer (higher-level device), and examples of the host device 10 include various information processing devices, such as a personal computer (PC), a server, a main frame, and the like.

The tape library device 20 receives various types of requests from the host device 10 via the virtual tape device 30 and performs various types of processing in accordance with the requests. The tape library device 20 stores a plurality of magnetic tapes (physical volumes; PVs) 211 which record and store data, a plurality (two in FIG. 12) of tape drives (physical drives) 21, and an accessor (robot, not illustrated). In response to a mount instruction received from the virtual tape device 30, the accessor moves a corresponding magnetic tape 211 from a storage rack (not illustrated) to a corresponding tape drive 21 and mounts the magnetic tape 211 in the tape drive 21. On the other hand, in response to an unmount instruction received from the virtual tape device 30, the accessor moves a magnetic tape 211 unmounted from a tape drive 21 to the storage rack from the tape drive 21 and stores it in a predetermined location in the storage rack.

Figure 12:
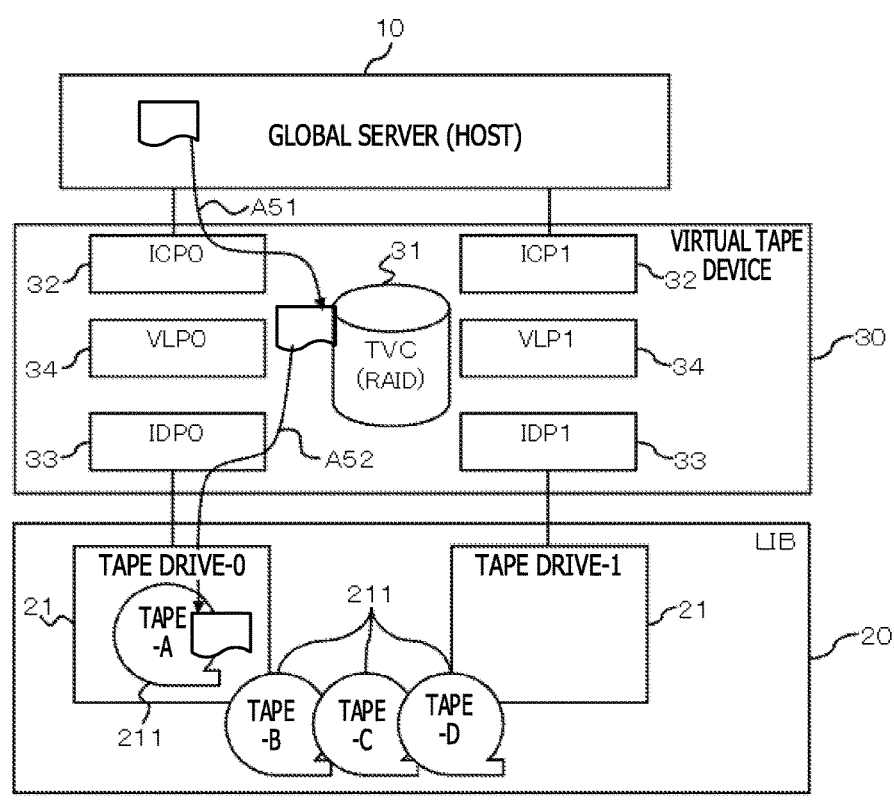
FIG. 12 is a block diagram illustrating a configuration of an existing storage system including a virtual tape device.

In FIG. 12, two tape drives 21 are illustrated and are denoted by Tape Drive-0 and Tape Drive-1 so as to be distinguished from one another. In FIG. 12, four magnetic tapes 211 are illustrated and are denoted by Tape-A, Tape-B, Tape-c, and Tape-D so as to be distinguished from one another. In FIG. 12, a state in which Tape-A is mounted in Tape Drive-0 is illustrated.

The virtual tape device 30 is provided between the host device 10 and the tape library device 20 and stores therein, as a tape volume (logical volume; LV), data transmitted and received between the host device 10 and the tape library device 20. Thus, the virtual tape device 30 places data as a logical volume (first logical volume) on a random access medium such as a magnetic disk device or the like, and thereby, virtually performs tape operations on the magnetic disk device. This allows the virtual tape device 30 to omit mechanical operations, such as tape mount, load/unload, and the like, thus realizing high-speed operations.

The virtual tape device 30 includes a TVC 31, an integrated channel processor (ICP) 32, an integrated device processor (IDP) 33, and a virtual library processor (VLP) 34. The TVC 31, the ICP 32, the IDP 33, and the VLP 34 are connected to one another via a bus, such as a universal serial bus (USB), or a local area network (LAN) so as to mutually communicate with one another.

The TVC 31 includes redundant arrays of inexpensive disks (RAID) storage and a file system, and stores therein, as a logical volume, data transmitted and received between the host device 10 and the tape library device 20.

The ICP 32 is connected to the host device 10, serves as a server that controls an interface with the host device 10, receives various types of instructions, various types of data, and the like from the host device 10 and transmits various types of data and the like to the host device 10.

The IDP 33 is connected to the tape library device 20 and serves as a server that controls the tape library device 20. The IDP 33 controls mounting/unmounting of a corresponding magnetic tape 211 on a corresponding tape drive 21, receives various data from the tape library device 20, and transmits various data to the tape library device 20.

The VLP 34 is a server that manages logical volumes (virtual tapes) stored in the TVC 31.

In FIG. 12, two ICPs 32 are illustrated and denoted by ICP0 and ICP1 so as to be distinguished from one another. In FIG. 12, two IDPs 33 are illustrated and are denoted by IDP0 and IDP1 so as to be distinguished from one another. In FIG. 12, two VLPs 34 are illustrated and are denoted by VLP0 and VLP1 so as to be distinguished from one another. Then, ICP0, IDP0, and VLP0 store, as a logical volume, data transmitted and received between the host device 10 and Tape Drive-0 in the TVC 31 and manage the data. Similarly, ICP1, IDP1, and VLP1 store, as a logical volume, data transmitted and received between the host device 10 and the Tape Drive-1 in the TVC 31 and manage the data.

In FIG. 12, ICP0, IDP0, VLP0, ICP1, IDP1, and VLP1 are illustrated as separate servers (processors), but may be configured as one or more servers (processors). For example, a configuration in which ICP0, IDP0, and VLP0 are configured by a single server and ICP1, IDP1, and VLP1 are configured by another single server may be employed.

In the above-described storage system, when receiving a write instruction to write logical volume data from the host device 10, the virtual tape device 30 stores the logical volume data in the TVC 31 (see an arrow A51 in FIG. 12). Processing in accordance with the write instruction is performed by the ICP 32 and VLP 34.

Thereafter, when receiving an unmount instruction for the logical volume from the host device 10, the virtual tape device 30 also writes and stores the logical volume data to a corresponding magnetic tape 211 in a corresponding tape library device 20 (see an arrow A51 in FIG. 12). Processing in accordance with the unmount instruction is performed by the VLP 34 and IDP 33.

Figure 14:
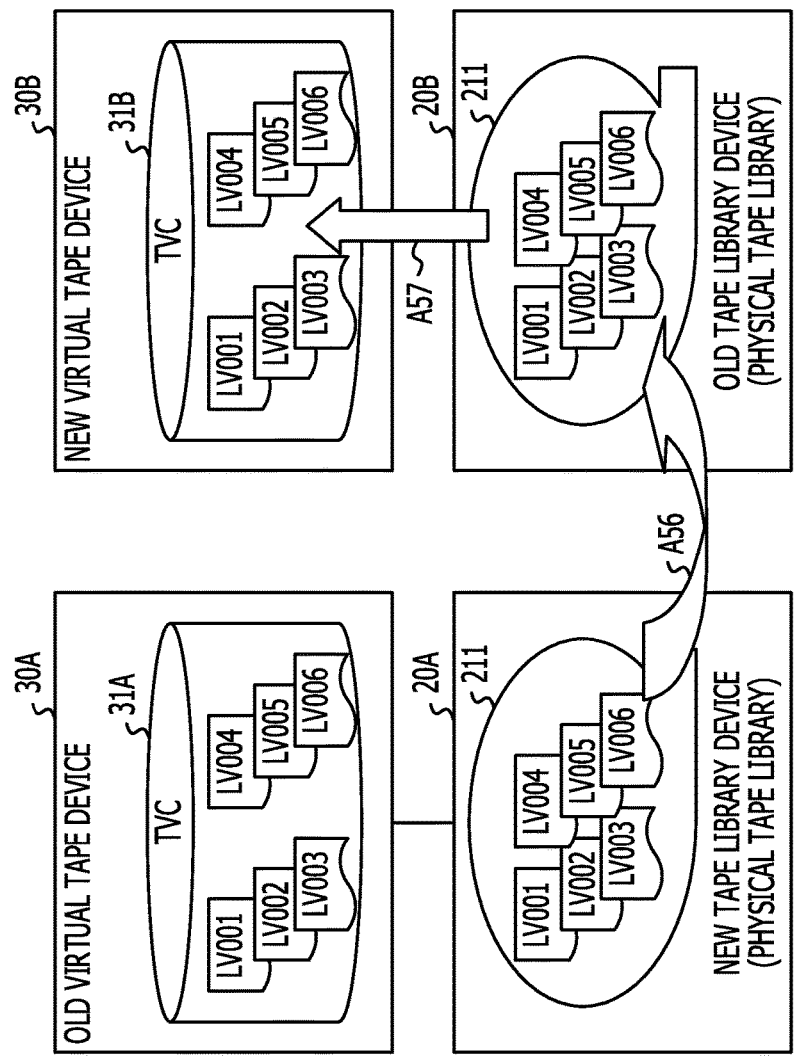
FIG. 14 is a diagram illustrating a data migration operation performed using a data migration tool in an existing storage system.

In TVC 31, a plurality of logical volume data pieces (see, for example, LV001 to LV006 in FIG. 14). Before the total amount of the logical volume data pieces stored in the TVC 31 exceeds the capacity of the TVC 31, old logical volume data pieces are erased from the TVC 31. Erasing processing is performed by the VLP 34. Data pieces erased from the TVC 31 are not erased from the corresponding magnetic tape 211 and remains to be stored in the magnetic tape 211.

When receiving from the host device 10 a mount instruction to mount a logical volume erased from the TVC 31 in a logical drive, the virtual tape device 30 reads data of the logical volume identified by the mount instruction from a magnetic tape 211 in the tape library device 20 and stores the data in the TVC 31.

Figure 13:
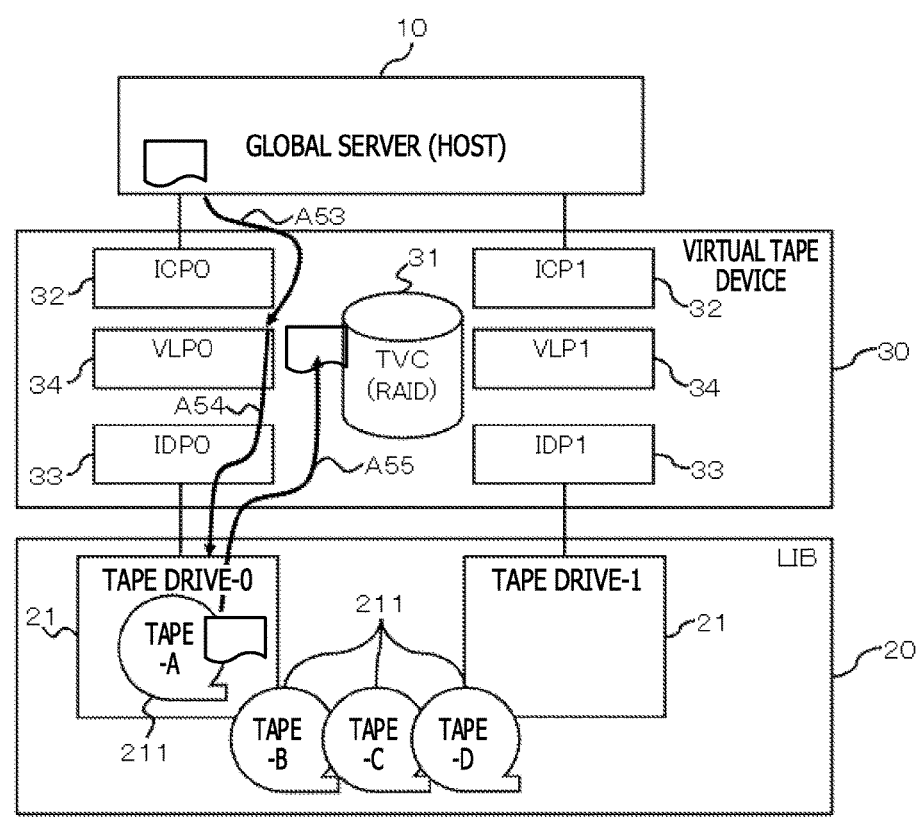
FIG. 13 is a diagram illustrating recall processing performed in an existing storage system.

In this case, when the mount instruction for the logical volume erased from the TVC 31 is received in the ICP 32 (see an arrow A53 in FIG. 13), a read instruction to read data corresponding to the logical volume is transmitted to the tape drive 21 from the IDP 33 (see an arrow A54 in FIG. 13).

When the read instruction is received in the tape drive 21, the data identified by the read instruction is read from the corresponding magnetic tape 211 and is stored in the TVC 31 via the corresponding IDP 33 (see an arrow A55 in FIG. 13). Thus, the logical volume identified by the mount instruction is mounted in the logical drive. The above-described processing is called recall processing. FIG. 13 is a diagram illustrating recall processing performed in the storage system illustrated in FIG. 12.

In the storage system described with reference to FIG. 12 and FIG. 13, when the virtual tape device 30 is changed, data migration operation from an old virtual tape device to a new virtual tape device is performed. In an existing data migration operation, it takes a long time (from several days to several weeks) to complete moving of all of the desired data pieces, as described above, and therefore, the whole data migration operation is not performed at one time but is performed in a planned manner.

As a possible method to perform data migration, data is migrated using a data migration tool (program) for use in migrating data from an old virtual tape device to a new virtual tape device. A data migration operation performed using a data migration tool in the storage system illustrated in FIG. 12 will be described below with reference to FIG. 14 and FIG. 15.

Figure 15:
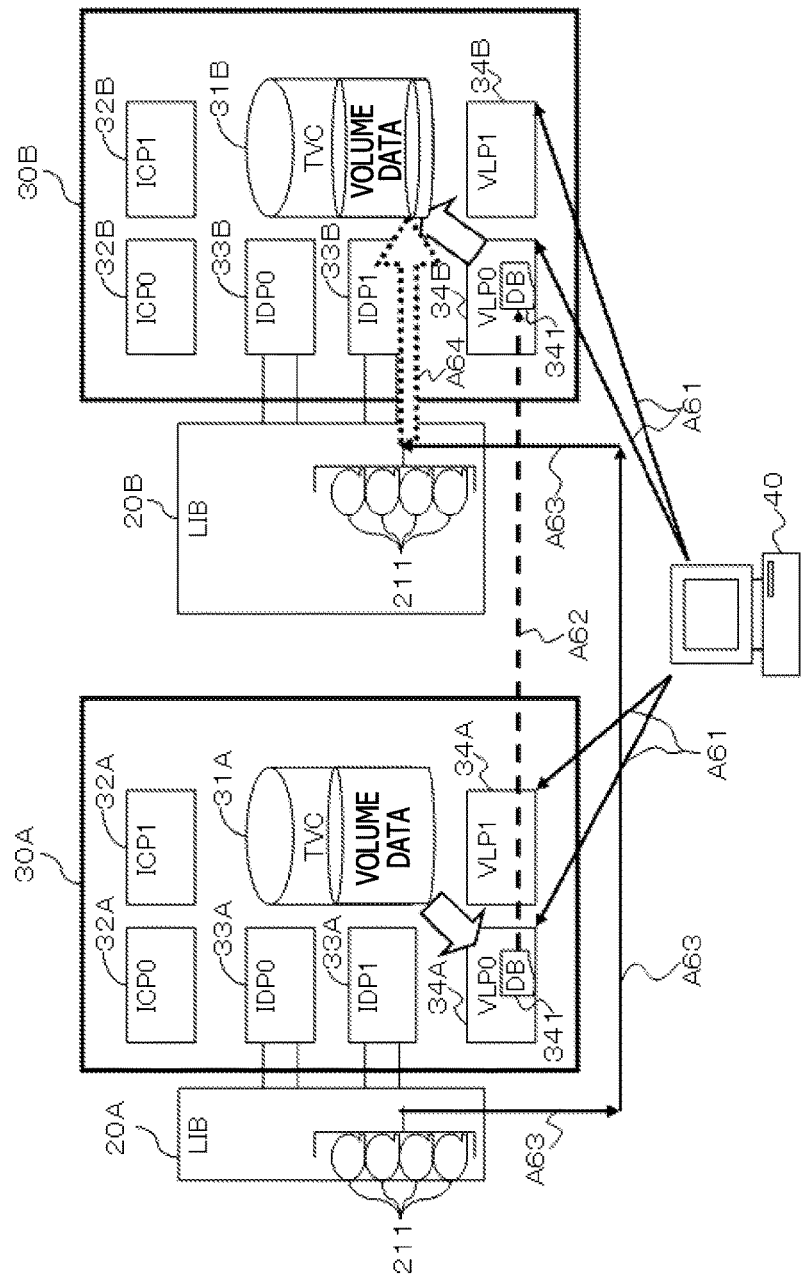
FIG. 15 is a diagram illustrating procedures of a data migration operation performed using a data migration tool in an existing storage system.

FIG. 14 is a diagram illustrating a data migration operation performed using a data migration tool, and FIG. 15 is a diagram illustrating procedures of a data migration operation performed using a data migration tool. In the following description, an old virtual tape device and a new virtual tape device are denoted by the reference numerals "30A" and "30B", respectively, "A" is added to the end of the reference character of each of elements which belong to the old virtual tape device 30A, and "B" is added to at the end of the reference character of each of elements which belong to the new virtual tape device 30B. Neither "A" nor "B" is added to the reference character of each of elements when not being distinguished as old or new.

First, a data migration operation performed using a data migration tool will be briefly described with reference to FIG. 14.

When a data migration tool is used, first, a database (DB) 341 (see FIG. 15) of the old virtual tape device 30A is copied to the new virtual tape device 30B. As will be described later, the database 341 includes various types of information (logical volume information, physical tape information, setting information, and the like) used by the VLP 34 to manage logical volumes in the TVC 31.

Thereafter, as illustrated in FIG. 14, all of the physical tapes (magnetic tapes) 211 stored in a tape library device 20A which belongs to the old virtual tape device 30A is moved to a tape library device 20B (see an arrow A56) which belongs to the new virtual tape device 30B. In this case, data of the logical volumes LV001 to LV006 stored in the TVC 31 are recorded and stored in the physical tapes 211 moved to the tape library device 20B.

A time taken to complete moving the physical tapes 211 by performing the above-described operation is about 3 hours, for example. At this point, the storage system including the new virtual tape device 30B is ready to start normal customer operations. Therefore, the data migration operation performed using a data migration tool allows normal operations of the storage system to be performed within a shorter time, as compared to the above-described existing data migration operation.

Now, a data migration operation performed using a data migration tool will be described in more detail with reference to FIG. 15.

When a data migration tool is used, first, a database recovery and prefetch (DBR/PRE) program, which is a data migration tool, is installed in the VLP 34 of the old virtual tape device 30A and the new virtual tape device 30B from a PC 40 for use in data migration (see an arrow A61). In this case, the PC 40 is connected to the old virtual tape device 30A and the new virtual tape device 30B via, for example, a network, such as a LAN and the like.

When the data migration tool installed in the VLP 34 is started, the DB 341 of the old virtual tape device 30A is copied to the new virtual tape device 30B (see an arrow A62). In this case, the database 341, which is held in the VLP 34A and includes various types of information for use in managing logical volumes in the TVC 31A, is transferred from the VLP 34A to the VLP 34B of the new virtual tape device 30B to be held in the VLP 34B. The database 341 held in the VLP 34B is used for reading the same logical volume as the logical volume held in the TVC 31A to the TVC 31B from the physical tape 211 to manage the logical volume.

The database 341 may be transferred via a network such as a LAN and the like (or a bus such as a USB and the like), which connects the old virtual tape device 30A (VLP 34A) and the new virtual tape device 30B (VLP 34B) to one another to allow them to mutually communicate to one another, or may be transferred via the PC 40.

FIG. 15 illustrates an example in which the database 341 is copied from VLP0 of the old virtual tape device 30A to VLP0 of the new virtual tape device 30B. If the database 341 is held in VLP1 of the old virtual tape device 30A, the database 341 is copied from VLP1 of the old virtual tape device 30A to VLP1 of the new virtual tape device 30B.

After the copying of the database 341 is completed, all of the physical tapes 211 stored in the tape library device 20A which belongs to the old virtual tape device 30A are moved to the tape library device 20B which belongs to the new virtual tape device 30B (see an arrow A56 in FIG. 14 and an arrow A63 in FIG. 15). As described above with reference to FIG. 14, at this point of time, the storage system including the new virtual tape device 30B is ready to start normal customer operations.

However, at the time when copying of the database 341 and moving of the physical tapes 211 are completed, the TVC (cache) 31B of the new virtual tape device 30B is empty (0%). Thus, on-cache processing (reading data from the physical tapes 211; see an arrow A57 in FIG. 14 and an arrow A64 in FIG. 15) is performed. In on-cache processing, based on the database 341, data of logical volumes specified in advance is read from a corresponding physical tape 211 and copied to the TVC 31B by the IDP 33B and the VLP 34B.

In this case, assume that the data amount of the logical volumes specified in advance is, for example, about ten percent of the total data amount of all of logical volumes to be copied to the TVC 31B. The logical volumes specified in advance may include data to be used in the following day, and in such a case, the data amount of the logical volumes specified in advance is about ten-odd percent to several tens percent of the total data amount. In any case, data of ten to several tens percent of the total data amount is stored in the TVC 31B by on-cache processing, but not all data pieces of the logical volumes (100%) are stored.

As described above, normal operations of the storage system may be started in a state in which not all data pieces of the logical volumes are copied to the TVC 31B. However, in this state, when a mount instruction for a logical volume to which on-cache processing has not been performed is received from the host device 10, recall processing (read processing from a corresponding physical tape 211) occurs in the new virtual tape device 30B. Thus, it takes a long time to complete processing in accordance with the mount instruction. If recall processing is not completed in a predetermined time, the mount instruction results in a timeout error. Therefore, copying (reading data from a corresponding physical tape 211; on-cache) data of logical volumes, to which on-cache processing to the TVC 31B has not been performed, is performed by a preload job on regular basis or on the previous day of a day on which the logical volume is to be used.

Thus, copying data of the logical volume to the TVC 31B is performed by on-cache processing by the data migration tool (on-cache processing for only the logical volumes specified in advance) and a preload job instructed from the host device 10. However, when all data pieces of the logical volumes are copied by on-cache processing and a preload job, data reading from corresponding physical tapes 211 moved to the tape library device 20B is performed. Therefore, it takes a long time (several days to several weeks) to complete copying all data pieces of logical volumes.

That is, in order to read out data of a logical volume from a corresponding physical tape 211, a series of mechanical tape operations (moving the physical volume from a storage rack to the tape drive 21, mounting the physical volume in the tape drive 21, loading, placement, reading, unloading, unmounting of the physical volume from the tape drive 21, and moving the physical volume from the tape drive 21 to the storage rack) are performed, and therefore, it takes a long time to complete copying of all data pieces of logical volumes.

When performing data migration operation, a customer (system user) selects a target logical volume on which on-cache processing is to be performed and selects a target logical volume on which a preload job is to be performed, and might feel that such selections are bothersome. That is, the customer desires all of desired data pieces of logical volumes to be copied to the TVC 31B by a single data migration operation.

First Embodiment

A storage control method executed when a virtual tape device is changed in a storage system according to a first embodiment will be described with reference to FIG. 1. FIG. 1 is a diagram illustrating a storage control method according to the present embodiment.

As illustrated in FIG. 1, in the storage system 1 according to the present embodiment, the old virtual tape device 30A and the new virtual tape device 30B are connected by a fibre channel (FC) cable 50, thereby providing an FC connection. Using a pseudo host function (which will be described later) in the new virtual tape device 30B, data migration processing is performed to migrate data from the old virtual tape device 30A to the new virtual tape device 30B via the FC cable 50 (see an arrow A1). When this processing is performed, data of logical volumes stored in the TVC 31A of the old virtual tape device 30A is read and all data pieces of the logical volumes VL001 to VL006 are copied to the TVC 31B of the new virtual tape device 30B.

Thus, all data pieces of the logical volumes in the TVC 31A are copied to the TVC 31B without going via the physical tapes 211 or the host device 10. Therefore, data migration processing from the old virtual tape device 30A to the new virtual tape device 30B is efficiently performed in a short time (1 to 2 days).

On the other hand, the physical tapes 211 stored in the tape library device 20A which belongs to the old virtual tape device 30A are moved to the tape library device 20B which belongs to the new virtual tape device 30B (see an arrow A2).

In the present embodiment, a case in which the tape library device 20 is changed as well as the virtual tape device 30 is described, but the present disclosure may be applied to a case in which the tape library device 20 is not changed and only the virtual tape device 30 is changed in a similar manner to the present embodiment. In such a case, moving the physical tape 211 illustrated in the arrow A2 in FIG. 1 is not performed.

In the present embodiment, main points of the storage control method executed when the virtual tape device 30 is changed in the storage system 1 according to the present embodiment are as described in (3-1) to (3-8). The storage control method according to the present embodiment is a method in which, when the virtual tape device 30 is changed, the virtual tape device 30 including the TVC (storage section) 31 is controlled by the IDP (device control section; computer) 33.

(3-1) The old virtual tape device (second virtual storage device) 30A which stores a logical volume is connected to the new virtual tape device (first virtual storage device) 30B. Thereafter, the IDP 33B functions as a pseudo host device connected to the old virtual tape device 30A and thereby reads out data of a logical volume (second logical volume) stored in the old virtual tape device 30A to store the data of the logical volume in the TVC 31B of the new virtual tape device 30B.

(3-2) The IDP 33B gives, to the old virtual tape device 30A, a mount instruction to mount the logical volume stored in the old virtual tape device 30A in the logical drive in the old virtual tape device 30A. Then, the IDP 33B reads out data of the logical volume mounted in the logical drive in accordance with the mount instruction and stores the data of the logical volume in the TVC 31B.

(3-3) When the data of the logical volume is read out, the IDP 33B gives, to the old virtual tape device 30A, an unmount instruction to unmount the logical volume from the logical drive in the old virtual tape device 30A.

(3-4) During normal operations, the ICP 32B (first host interface control section) compresses a volume received from the host device 10 to store the volume in the TVC 31, and decompresses the compressed volume stored in the TVC 31 to read out the data of the volume to the host device 10.

(3-5) The IDP 33B compresses the data of the logical volume read out from the old virtual tape device 30A to store the data in the TVC 31B.

(3-6) The IDP 33B has functions as a mount instruction section 331, an unmount instruction section 332, a pseudo host function section 333, and a compression section 334.

(3-7) The IDP 33B is connected to the ICP 32A (second host interface control section), which is connected, during normal operations of the old virtual tape device 30A, to a host device for the old virtual tape device 30A and controls an interface with the host device. Thus, the old virtual tape device 30A and the new virtual tape device 30B are connected to one another.

(3-8) The IDP 33B is connected to the ICP 32A (second host interface control section) in the old virtual tape device 30A via the FC cable 50.

Figure 2:
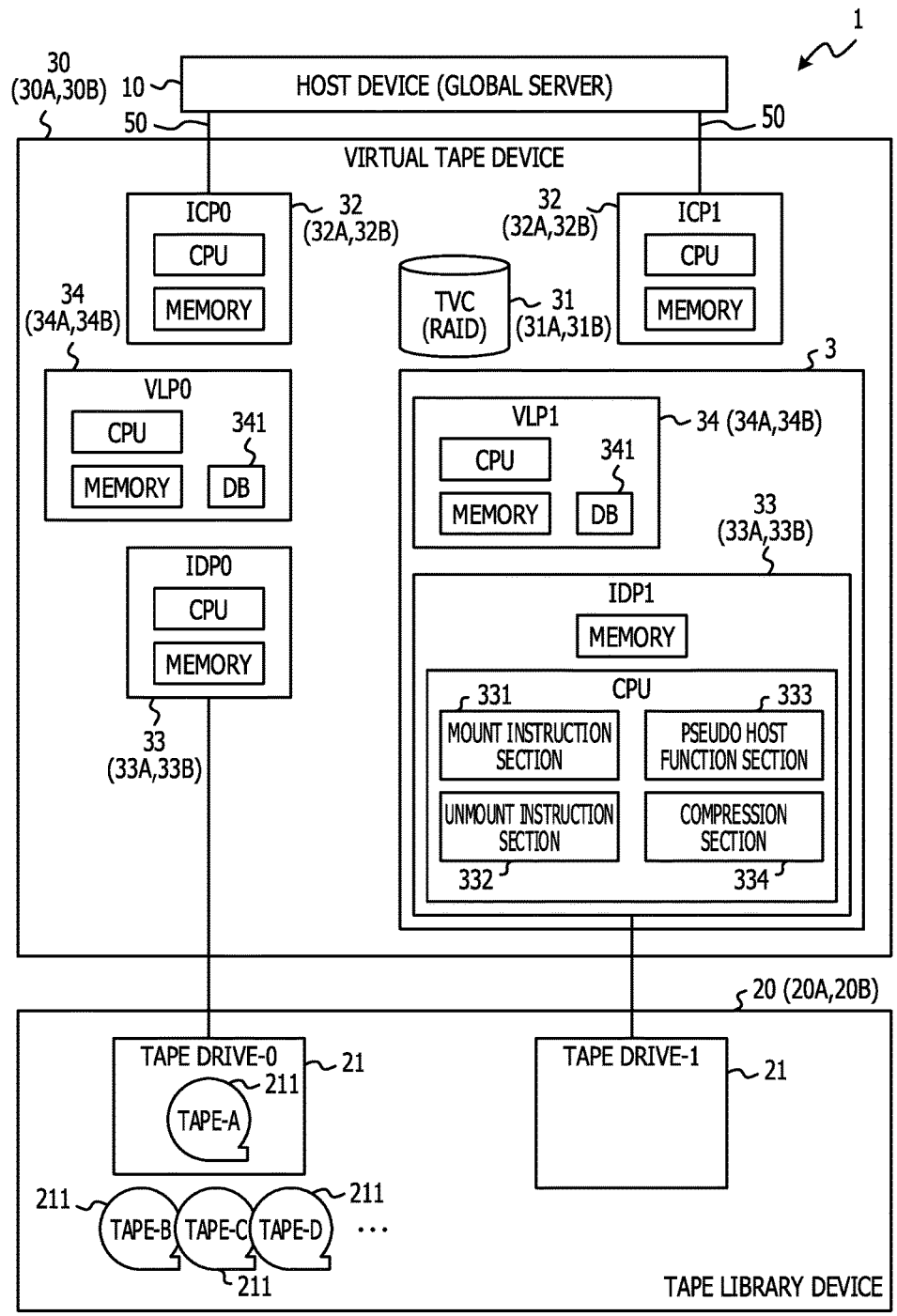
FIG. 2 is a block diagram illustrating hardware configuration and functional configuration of a virtual tape device according to an embodiment.

A configuration of the virtual tape device (virtual storage device) 30 in the storage system 1 according to the present embodiment, which realizes the above-described storage control method, will be described with reference to FIG. 2. FIG. 2 is a block diagram illustrating a configuration of the storage system 1 according to the present embodiment and hardware configuration and functional configuration of the virtual tape device 30 in the storage system 1. In FIG. 2, those parts which are the same or the substantially the same as the already described corresponding parts are denoted by the same reference characters as those already described, and therefore, the detailed description thereof will be omitted.

As illustrated in FIG. 2, the storage system 1 according to the present embodiment includes the host device 10, the tape library device 20, and the virtual tape device 30 similar to the storage system illustrated in FIG. 12.

The tape library device (physical storage device) 20 stores therein the plurality of magnetic tapes (PVs) 211 which record and store therein data. In the tape library device 20, each of the magnetic tapes 211 is mounted in the corresponding tape drive 21, and thereby, the tape drive 21 writes/reads data to/from each of the magnetic tapes 211.

The virtual tape device (virtual storage device) 30 is provided between the host device 10 and the tape library device 20 and stores, as a virtual tape volume (LV), data transmitted and received between the host device 10 and the tape library device 20. The virtual tape device 30 according to the present embodiment also includes the TVC 31, the ICP 32, the IDP 33, and the VLP 34. The TVC 31, the ICP 32, the IDP 33, and the VLP 34 are connected to one another via a bus such as a USB and the like, or a network such as a LAN and the like, so as to communicate with one another. A storage control apparatus 3 according to the present embodiment includes the IDP 33 and the VLP 34.

The TVC (cache) 31 includes a RAID storage and a file system, and stores, as a logical volume, data transmitted and received between the host device 10 and the tape library device 20. The TVC 31 may include a plurality of hard disk drives (HDDs) and may include another storage section such as a solid state drive (SSD) and the like.

The ICP 32 (first and second host interface control sections) is a server that is connected to the host device 10 via the FC cable 50 to control an interface with the host device 10 during normal operations. The ICP 32 receives various types of instructions and various types of data from the host device 10, and transmits various types of data to the host device 10. The ICP 32 compresses a volume received from the host device 10 and formats the volume to store it in the TVC 31, and also decompresses the compressed volume of the TVC 31 to transmit the volume to the host device 10.

The ICP 32 includes at least a processing unit such as a central processing unit (CPU) and a memory that stores various types of information including an operating system (OS), an application program, and the like. The processing unit executes programs stored in the memory, and thereby, the ICP 32 performs various types of processing including data compression processing, formatting processing, and data decompression processing.

The VLP 34 is a server that performs management of virtual tapes (LVs) stored in the TVC 31 using the DB 341. As described above, the database 341 includes various types of information (logical volume information, physical tape information, setting information, and the like) for use in managing the virtual tapes (LVs) in the TVC 31. Examples of the logical volume information include a logical volume name, the date of the latest update, and the like, and examples of the physical tape information include information of the corresponding physical tape 211, information of the logical volume recorded in the corresponding physical tape 211, and the like.

Similar to the ICP 32 described above, the VLP 34 includes at least a processing unit such as a CPU and the like and a memory that stores various types of information including an OS, an application program, and the like. The processing unit executes programs stored in the memory, and thereby, the VLP 34 performs various types of processing including management processing of virtual tapes. When data migration from the old virtual tape device 30A to the new virtual tape device 30B is performed, a data migration tool (program) is installed in the memory of the VLP 34 by the PC 40 for use in data migration.

The IDP (device control section) 33 is a server that is connected to the tape library device 20 to control the tape library device 20 during normal operations. The IDP 33 controls mounting/unmounting of the corresponding magnetic tape 211 in the corresponding tape drive 21, and receives and transmits various types of data from and to the tape library device 20.

The IDP 33 according to the present embodiment has functions as the mount instruction section 331, the unmount instruction section 332, the pseudo host function section 333, and the compression section 334.

Similar to the ICP 32 and the VLP 34 described above, the IDP 33 includes at least a processing unit such as a CPU and the like and a memory which stores various types of information including an OS, an application program, and the like. The processing unit executes a storage control program stored in the memory, and thereby, the IDP 33 performs the functions as the mount instruction section 331, the unmount instruction section 332, the pseudo host function section 333, and the compression section 334.

The functions as the mount instruction section 331, the unmount instruction section 332, the pseudo host function section 333, and the compression section 334 may be included at least in the IDP 33B of the new virtual tape device 30B, that is, a data migration destination. These functions may also be included in the IDP 33A of the old virtual tape device 30A, that is, a data migration source.

FIG. 2 illustrates the case in which the functions as the mount instruction section 331, the unmount instruction section 332, the pseudo host function section 333, and the compression section 334 are included in IDP1 of the two IDPs 33. These functions may be included in IDP0, or may be included in both of the two IDPs 33.

In the present embodiment, when data migration from the old virtual tape device 30A to the new virtual tape device 30B is performed, the IDP 33B of the new virtual tape device 30B and the ICP 32A (second host interface control section) of the old virtual tape device 30A are connected to one another via the FC cable 50 as described later with reference to FIG. 3 and FIG. 4. Thus, the old virtual tape device 30A (second virtual storage device) and the new virtual tape device 30B are connected to one another. In this case, a port of the new virtual tape device 30B (IDP 33B) to which the tape library device 20B is connected during normal operations and a port of the old virtual tape device 30A (ICP 32A) to which the host device 10 is connected during normal operations are connected to one another via the FC cable 50.

The functions of the mount instruction section 331, the unmount instruction section 332, the pseudo host function section 333, and the compression section 334 in the new virtual tape device 30B will be described below. Specifically, the functions performed when the old virtual tape device 30A and the new virtual tape device 30B are connected to one another via the FC cable 50 in order to perform data migration from the old virtual tape device 30A to the new virtual tape device 30B will be described.

The mount instruction section 331 gives, to the old virtual tape device 30A, a mount instruction (mount order) to mount a logical volume stored in the TVC 31A of the old virtual tape device (second virtual storage device) 30A in a logical drive in the old virtual tape device 30A. Thus, in the old virtual tape device 30A, the logical volume stored in the TVC 31A is mounted in the logical drive in the ICP 32A of the old virtual tape device 30A in accordance with the mount instruction given by the mount instruction section 331.

When the old virtual tape device 30A is connected to the new virtual tape device 30B, the pseudo host function section 333 functions as a pseudo host device connected to the old virtual tape device 30A. Thus, the pseudo host function section 333 reads out data of the logical volume (logical volume of the TVC 31A) mounted in the logical drive in the old virtual tape device 30A to the new virtual tape device 30B (IDP 33).

When the data of the logical volume is read out by the pseudo host function section 333, the unmount instruction section 332 gives, to the old virtual tape device 30A, an unmount instruction (an unmount order) to unmount the logical volume from the logical drive in the old virtual tape device 30A. Thus, in the old virtual tape device 30A, the readout logical volume is unmounted from the logical drive in accordance with the unmount instruction received from the unmount instruction section 332.

The compression section 334 compresses (formats) the logical volume read out from the old virtual tape device 30A by the pseudo host function section 333 to store the logical volume in the TVC 31B. In this case, data stored in the TVC 31 is compressed. When being read out from the TVC 31A, data stored in the TVC 31A of the old virtual tape device 30A is decompressed by the ICP 32A and the decompressed data is transferred to the new virtual tape device 30B.

In the present embodiment, ICP0, IDP0, VLP0, ICP1, IDP1, and VLP1 are illustrated as separate servers (processors) in FIG. 2, but may be configured as one or more servers (processors). For example, a configuration in which ICP0, IDP0, and VLP0 are configured by a single server and ICP1, IDP1, and VLP1 are configured by another single server may be employed.

Next, the operations of the storage system 1 and the virtual tape device 30 (30A, 30B), which are configured in the manner described above, according to the present embodiment will be described.

First, data migration from the old virtual tape device 30A to the new virtual tape device 30B performed using a data migration tool will be described with reference to FIG. 3 and FIG. 4. FIG. 3 and FIG. 4 are diagrams illustrating procedures of data migration operation performed by the virtual tape device 30 (30A, 30B) illustrated in FIG. 2 in detail.

Similar to the example illustrated in FIG. 15, in the VLP 34 of each of the old virtual tape device 30A and the new virtual tape device 30B, a DBR/PRE program, that is, a data migration tool, is installed (see an arrow A1 in FIG. 3) from the PC 40. In this case, the PC 40 is connected to the old virtual tape device 30A and the new virtual tape device 30B, for example, via a network such as a LAN and the like.

Figure 3:
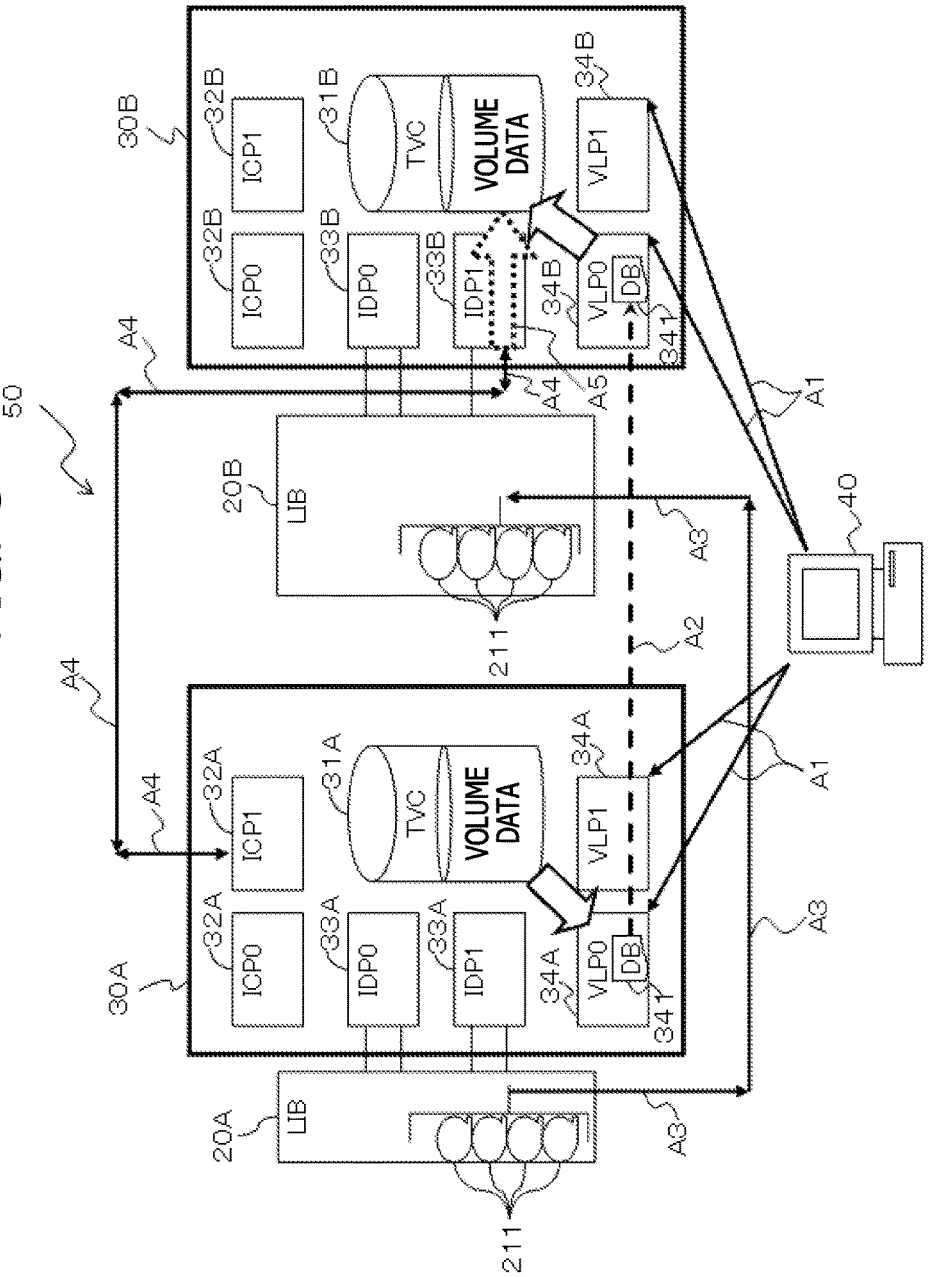
FIG. 3 is a diagram illustrating procedures of a data migration operation performed by a virtual tape device according to an embodiment.

When the data migration tool installed in the VLP 34 is started, the database 341 of the old virtual tape device 30A is copied to the new virtual tape device 30B (see an arrow A2 in FIG. 3). In this case, the database 341, which is held in the VLP 34A and includes the logical volume information and the physical tape information which have been described above, is transferred from the VLP 34A to the VLP 34B of the new virtual tape device 30B to be held in the VLP 34B. The database 341 held in the VLP 34B is used for reading the same logical volume as the logical volume held in the TVC 31A to the TVC 31B from the physical tapes 211 to manage the logical volume.

The database 341 may be transferred via a network such as a LAN and the like (or the bus such as an USB and the like), which connects the old virtual tape device 30A (VLP 34A) and the new virtual tape device 30B (VLP 34B) to one another to allow them to mutually communicate to one another, or may be transferred via the PC 40.

Similar to the example illustrated in FIG. 15, FIG. 3 illustrates an example in which the database 341 is copied from VLP0 of the old virtual tape device 30A to VLP0 of the new virtual tape device 30B. If the database 341 is held in VLP1 of the old virtual tape device 30A, the database 341 is copied from VLP1 of the old virtual tape device 30A to VLP1 of the new virtual tape device 30B.

After the copying of the database 341 is completed, all of the physical tapes 211 stored in the tape library device 20A which belongs to the old virtual tape device 30A is discharged. The physical tapes discharged from the tape library device 20A are put (moved) to the tape library device 20B which belongs to the new virtual tape device 30B (see an arrow A3 in FIG. 3).

At this point, the TVC (cache) 31B of the new virtual tape device 30B is empty (0%). Thus, on-cache processing (reading data from the physical tapes 211; see arrows A4 and A5 in FIG. 3 and arrows A11 to A15 in FIG. 4) is performed by a data migration tool.

When on-cache processing is performed by the data migration tool, a logical volume is read from the TVC 31A of the old virtual tape device 30A using the mount instruction section 331, the unmount instruction section 332, and the pseudo host function section 333 in the IDP 33B of the new virtual tape device 30B in the following manner.

Figure 4:
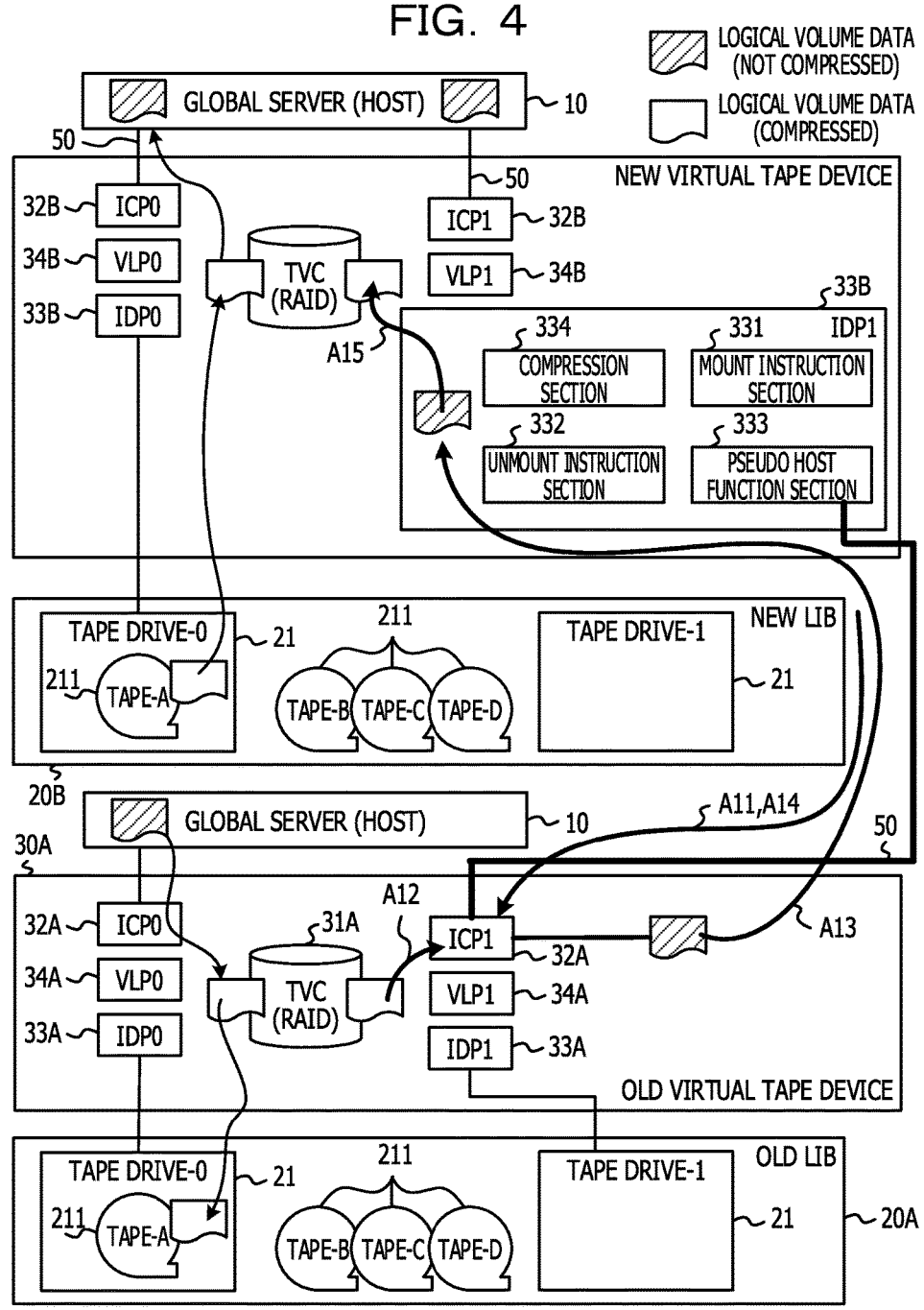
FIG. 4 is a diagram illustrating procedures of a data migration operation performed by a virtual tape device according to an embodiment.

Before on-cache processing, as illustrated in FIG. 3 and FIG. 4, the IDP 33B (physical library control process) of the new virtual tape device 30B, that is, a data migration destination, and the ICP 32A (host interface control process) of the old virtual tape device 30A, that is, a data migration source, are connected to one another via the FC cable 50.

The IDP 33B controls the tape library device (physical library) 20B during normal operations, and mounts and unmounts the physical tapes 211 in and from the tape drives 21. In the present embodiment, when on-cache processing is performed, the IDP 33B gives a mount instruction to the old virtual tape device 30A using the function of the mount instruction section 331 (see an arrow A11 in FIG. 4). Thus, in the old virtual tape device 30A, the logical volume stored in the TVC 31A is mounted in the logical drive in the ICP 32A of the old virtual tape device 30A (see an arrow A12 in FIG. 4).

Subsequently, the IDP 33B reads data of the logical volume mounted in the logical drive in the old virtual tape device 30A using the pseudo host function section 333 (see an arrow A13 in FIG. 4). Thereafter, the IDP 33B gives an unmount instruction to the old virtual tape device 30A using the function of the unmount instruction section 332 (see an arrow A14 of FIG. 4). Thus, in the old virtual tape device 30A, the readout logical volume is unmounted from the logical drive.

In the above-described processing, in response to an instruction given by the IDP 33B of the new virtual tape device 30B, the old virtual tape device 30A operates as if the operation is ordered by the host device 10.

As described above, normally, data of the logical volume stored in the TVC 31B is compressed, but data of the logical volume read from the ICP 32A of the old virtual tape device 30A is decompressed data. Therefore, data of the logical volume read from the old virtual tape device 30A is compressed (is formatted) by the function as the compression section 334 of the IDP 33B and then stored in the TVC 31B (see an arrow A5 in FIG. 3 and an arrow A15 in FIG. 4).

In the present embodiment, data migration operation from the old virtual tape device 30A to the new virtual tape device 30B is performed in the manner described above. Detailed procedures of on-cache processing according to the present embodiment will be described later with reference to FIG. 5 and FIG. 6. Formatting processing according to the present embodiment will be described later with reference to FIG. 7 to FIG. 9.

Next, procedures of on-cache processing according to the present embodiment will be described.

Figure 5:
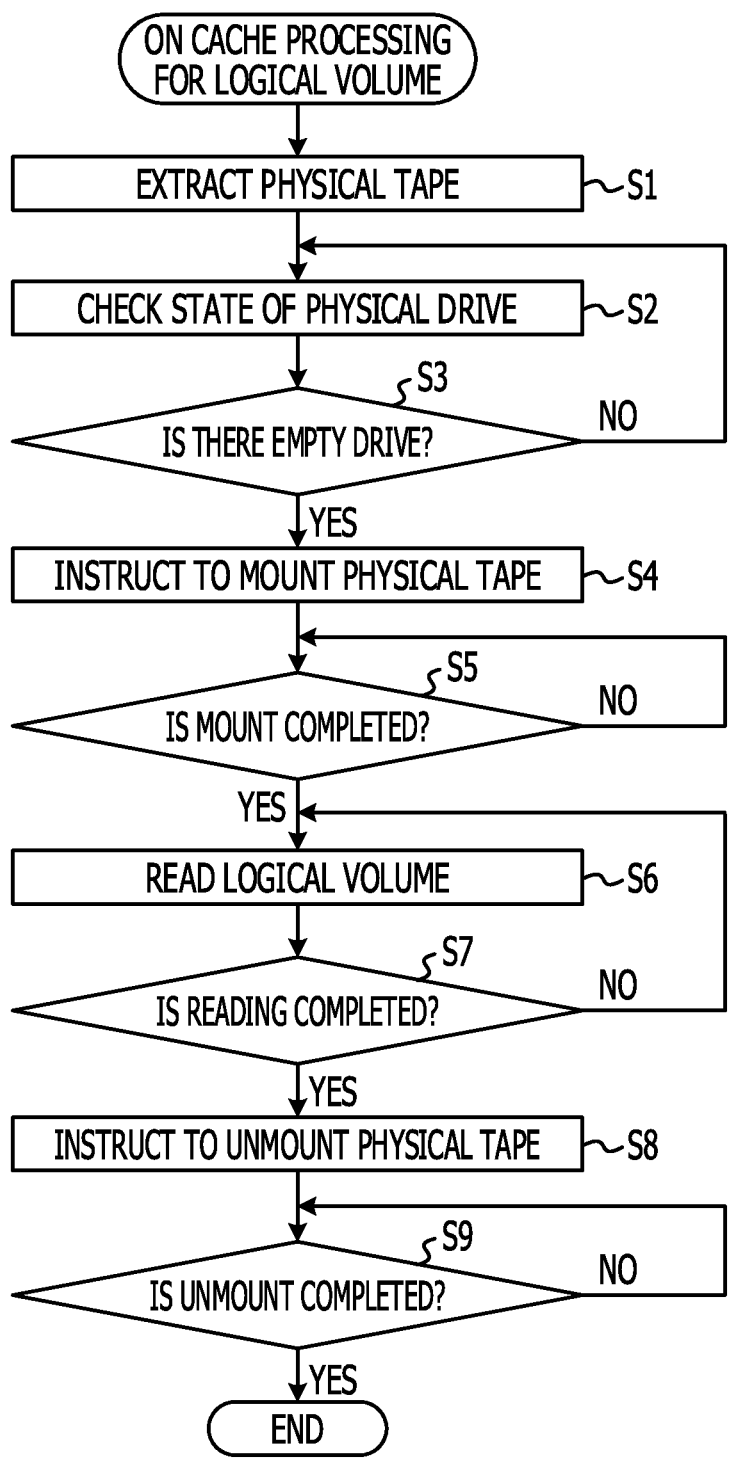
FIG. 5 is a flow chart illustrating procedures of on-cache processing.

First, the procedures of on-cache processing illustrated in FIG. 14 and FIG. 15 will be described in accordance with a flow chart (S1 to S9) illustrated in FIG. 5. In on-cache processing illustrated in FIG. 14 and FIG. 15 (see an arrow A57 in FIG. 14 and an arrow A64 in FIG. 15), the logical volumes are read out from the physical tapes 211. The procedures of on-cache processing illustrated in FIG. 14 and FIG. 15 will be described below in more detail.

The IDP 33B of the new virtual tape device 30B selects and extracts, with reference to the database 341 copied from the old virtual tape device 30A, a physical tape 211 in which a logical volume to be read out from the old virtual tape device 30A (TVC 31A) is written (S1). Then, the IDP 33B checks the state of the physical drives 21 in the tape library device 20B (S2) and determines whether or not there is an empty drive (S3).

If there is no empty drive (NO in S3), the IDP 33B returns to processing of S2. If there is an empty drive (YES in S3), the IDP 33B instructs the physical drive 21, that is, the empty drive, to mount the physical tape 211 selected in S1 (S4). Then, the IDP 33B determines whether or not the mounting of the physical tape 211 is completed (S5).

If the mounting is not completed (NO in S5), the IDP 33B returns to processing of S5. If the mounting is completed (YES in S5), the IDP 33B reads data of the logical volume from the physical tape 211 via the physical drive 21 and stores the read data of logical volume in the TVC 31B of the new virtual tape device 30B (S6). The IDP 33B determines whether or not the reading of data of the desired logical volume from the physical tape 211 is completed (S7).

If the reading is not completed (NO in S7), the IDP 33B returns to processing of S6. If the reading is completed (YES in S7), the IDP 33B instructs the physical drive 21 to unmount the physical tape 211 (S8). Then, the IDP 33B determines whether or not the unmounting of the physical tape 211 is completed (S9). If the unmounting is not completed (NO in S9), the IDP 33B returns to processing of S9. If the unmounting is completed (YES in S9), the IDP 33B ends processing preformed on the physical tape 211.

The above-described processing is repeatedly performed until all data pieces of the logical volumes stored in the TVC 31A of the old virtual tape device 30A or all data pieces of the specified desired logical volumes are read from the corresponding physical tapes 211 and stored in the TVC 31B of the new virtual tape device 30B.

As described above, in on-cache processing illustrated in FIG. 14 and FIG. 15, in order to read out a logical volume from a physical tape 211, a series of mechanical tape operations are performed, and thus, it takes a long time to complete copying of all data pieces of the logical volumes or the desired logical volumes.

Figure 6:
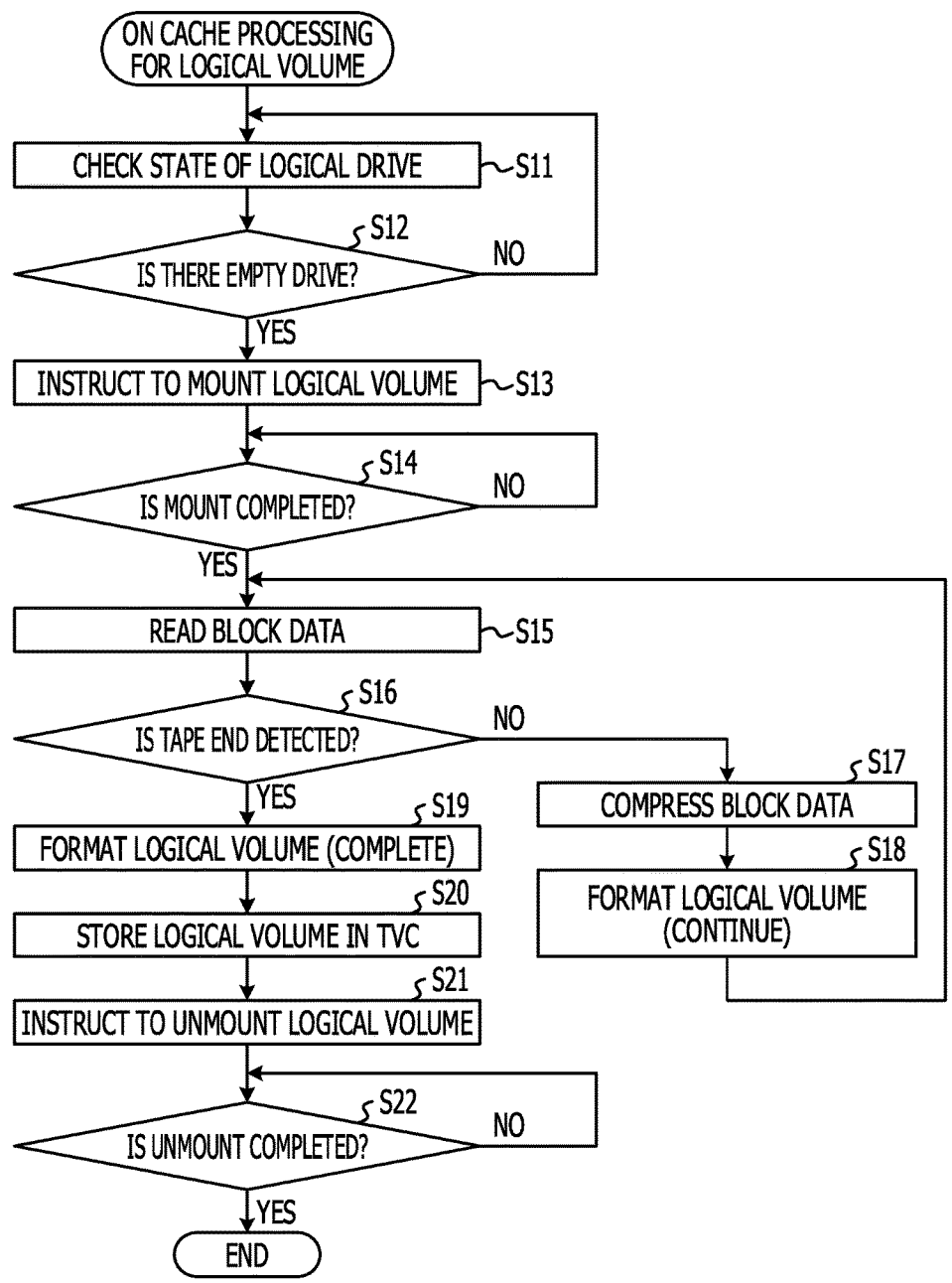
FIG. 6 is a flow chart illustrating procedures of on-cache processing performed by a virtual tape device according to an embodiment.

In contrast, on-cache processing according to the present embodiment is performed by procedures illustrated in FIG. 6 as follows. Here, procedures of on-cache processing performed by the virtual tape device 30 (new virtual tape device 30B) illustrated in FIG. 2 will be described in accordance with a flow chart illustrated in FIG. 6 (S11 to S22). In on-cache processing (see arrows A4 and A5 in FIG. 3 and arrows A11 to A15 in FIG. 4) according to the present embodiment, reading of data from the physical tapes 211 is not performed but data of logical volumes in the old virtual tape device 30A (TVC 31A) is read out. The procedures of on-cache processing according to the present embodiment will be described below in more detail.

First, the mount instruction section 331 in the IDP 33B of the new virtual tape device 30B checks the state of logical drives in the ICP 32A of the old virtual tape device 30A (S11), and determines whether or not there is an empty drive (S12).

If there is no empty drive (No in S12), the mount instruction section 331 returns to processing of S11. If there is an empty drive (YES in S12), the mount instruction section 331 instructs the logical drive, that is, the empty drive, to mount the logical volume (virtual tape) in the TVC 31A (S13). Then, the IDP 33B (mount instruction section 331) determines whether or not the mounting of the logical volume is completed (S14).

If the mounting is not completed (NO in S14), the IDP 33B (mount instruction section 331) returns to processing of S14. If the mounting is completed (YES in S14), a single block data piece of the target logical volume to be read is read from the logical drive of the IDP 33A by the IDP 33B via the FC cable 50 in accordance with an instruction (order) given by the pseudo host function section 333 of the IDP 33B (S15).

Thereafter, the IDP 33B (pseudo host function section 333) determines whether or not the read block data is a tape end (end of data; EOD) (S16). If the read block data is not the tape end (NO in S16), the compression section 334 of the IDP 33B compresses the read block data (S17), continues formatting of the logical volume (S18), and returns to processing of S15. The above-described processing of S15 to S18 is repeatedly performed until the tape end (EOD) is detected in S16. If the tape end (EOD) is detected (YES in S16), the IDP 33B (pseudo host function section 333) completes formatting of the logical volume (S19), and stores the formatted logical volume in the TVC 31B (S20). Data compression and formatting processing performed in S17 to S19 will be described later with reference to FIG. 9.

When the logical volume is stored in the TVC 31B, the unmount instruction section 332 of the IDP 33B instructs the logical drive in the ICP 32A of the old virtual tape device 30A to unmount the logical volume (S21). Then, the IDP 33B (unmount instruction section 332) determines whether or not the unmounting of the logical volume is completed (S22).

If the unmounting is not completed (NO in S22), the IDP 33B (unmount instruction section 332) returns to processing of S22. If the unmounting is completed (YES in S22), the IDP 33B ends the processing performed for the logical volume.

The above-described processing is repeatedly performed until data of all logical volumes stored in the TVC 31A of the old virtual tape device 30A is read from the TVC 31A and stored in the TVC 31B of the new virtual tape device 30B via the FC cable 50.

As described above, in the present embodiment, in accordance with the instruction given by the IDP 33B of the new virtual tape device 30B, the old virtual tape device 30A operates as if the operation is instructed by the host device 10. Thus, reading of data from the physical tape 211 is not performed, and data migration operation from the old virtual tape device 30A to the new virtual tape device 30B is efficiently performed via the FC cable 50 in a short time.

Figure 7:
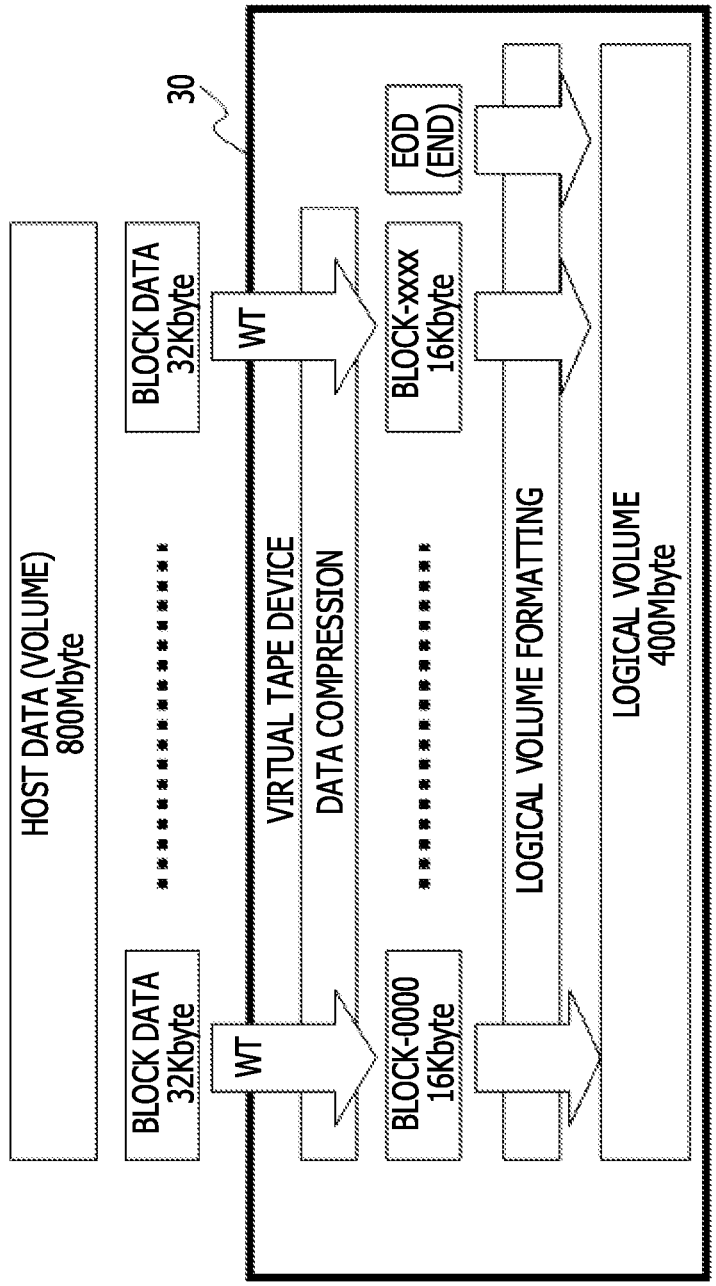
FIG. 7 is a diagram illustrating logical volume formatting processing performed during a normal operation (write processing from a host device)
Figure 8:
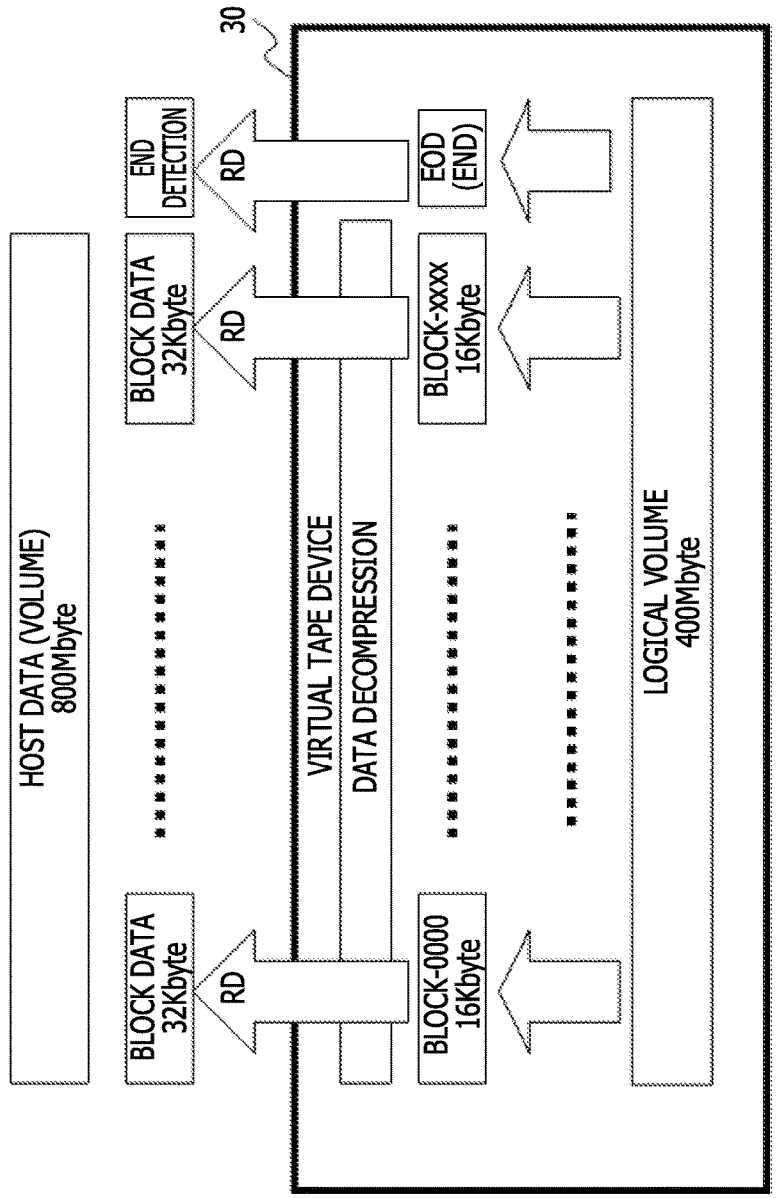
FIG. 8 is a diagram illustrating logical volume formatting processing performed during a normal operation (read processing from a host device)
Figure 9:
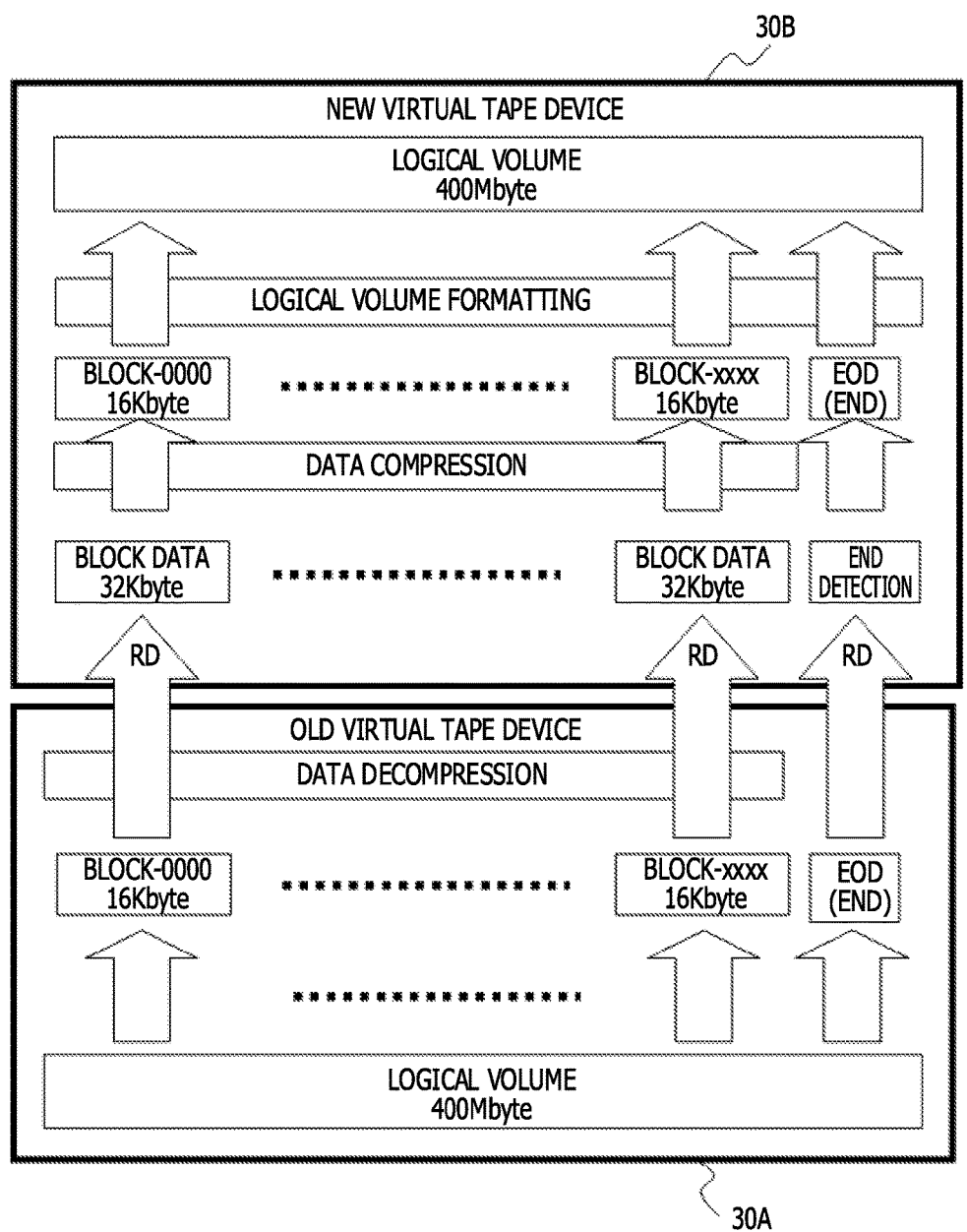
FIG. 9 is a diagram illustrating logical volume formatting processing performed when a virtual tape device according to an embodiment is changed.

Next, logical volume formatting processing performed when the virtual tape device 30 according to the present embodiment is changed will be described with reference to FIG. 7 to FIG. 9. FIG. 7 is a diagram illustrating logical volume formatting processing performed during a normal operation (write processing from the host device 10). FIG. 8 is a diagram illustrating logical volume formatting processing performed during a normal operation (read processing from the host device 10). FIG. 9 is a diagram illustrating logical volume formatting processing performed when the virtual tape device 30 according to the present embodiment is changed.

As illustrated in FIG. 7, for example, when host data (volume) of 800 Mbyte is written from the host device 10 to the TVC 31 of the virtual tape device 30, the host data is read by the virtual tape device 30 by each block data piece of, for example, 32 Kbyte. Each block data piece is compressed, for example, to a compressed data piece of 16 Kbyte in the ICP 32. Then, when the EOD representing the end of the host data is detected, in the ICP 32, the compressed data pieces (Block-0000 to Block-xxxx) for all of the block data pieces are formatted and stored as a single logical volume of 400 Mbyte in the TVC 31.

As illustrated in FIG. 8, when the logical volume of, for example, 400 Mbyte stored in the TVC 31 in the manner described above is read out from the TVC 31 of the virtual tape device 30 to the host device 10, the logical volume is divided into data pieces of, for example, 16 Kbyte. Each of the divided data pieces (Block-0000-Block-xxxx) is in a compressed state, and is decompressed to a block data piece of, for example, 32 Kbyte by the ICP 32. Thus, block data which is not compressed is transferred from the virtual tape device 30 to the host device 10. Then, in the host device 10, the host data of, for example, 800 Mbyte is obtained, based on the block data transferred from the virtual tape device 30 and the EOD (end of data).

As illustrated in FIG. 9, in the case in which data migration from the old virtual tape device 30A to the new virtual tape device 30B is performed upon change of the virtual tape device 30 in the present embodiment, logical volume formatting processing is performed in the following manner. That is, first, the logical volume of, for example, 400 Mbyte in the TVC 31A of the old virtual tape device 30A is divided into data pieces of, for example, 16 Kbyte in the ICP 32A of the old virtual tape device 30A. Each of the divided data pieces (Block-0000-Block-xxxx) is in a compressed state, and is decompressed to a block data piece of, for example, 32 Kbyte by the ICP 32A. Thus, block data which is not compressed is transferred from the old virtual tape device 30A to the new virtual tape device 30B. Thereafter, each block data piece is compressed, for example, to a compressed data piece of 16 Kbyte by the compression section 334 of the IDP 33B. When the EOD representing the end of the data is detected, the compressed data pieces (Block-0000 to Block-xxxx) for all of the block data pieces are formatted and stored as a single logical volume of 400 Mbyte in the TVC 31B.

Figure 10:
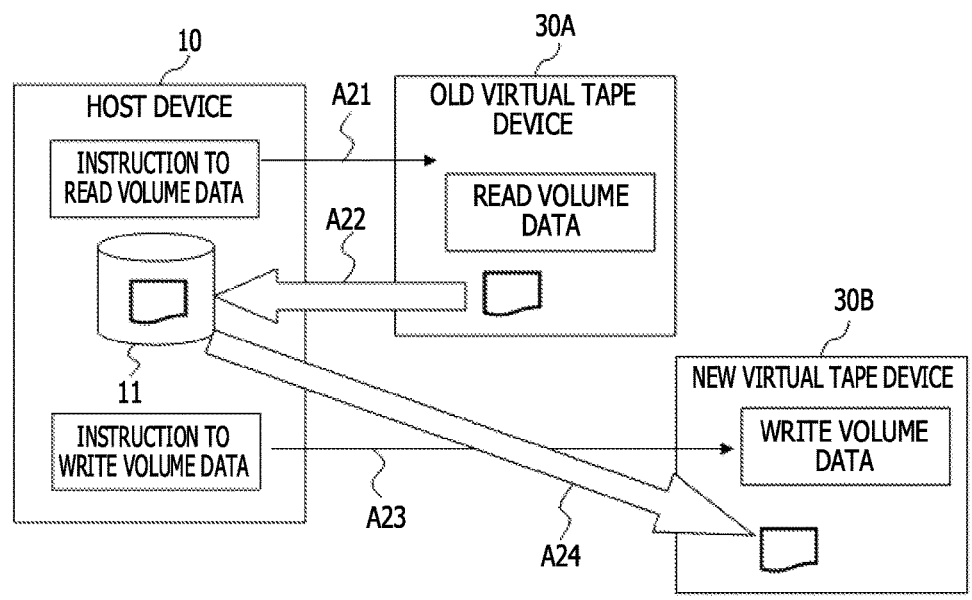
FIG. 10 is a diagram illustrating existing data copying performed via a host device.
Figure 11:
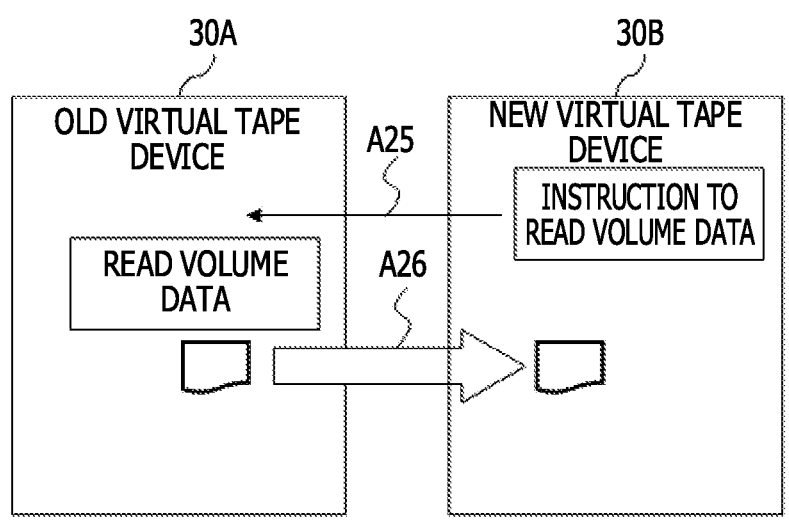
FIG. 11 is a diagram illustrating data copying performed by a virtual tape device according to an embodiment.

Next, data copying performed via the host device 10 and data copying performed according to the present embodiment will be compared to one another with reference to FIG. 10 and FIG. 11. FIG. 10 is a diagram illustrating existing data copying performed via the host device 10. FIG. 11 is a diagram illustrating data copying performed by the virtual tape device 30 (30A, 30B) illustrated in FIG. 2.

As illustrated in FIG. 10, in data copying performed via the host device 10, the volume data is read from the old virtual tape device 30A (TVC 31A) in accordance with a volume data read instruction (see an arrow A21) sent from the host device 10. Then, the read volume data is temporarily stored in a disk device 11 or the like, which is connected to the host device 10 (see an arrow A22). Thereafter, in accordance with a volume data write instruction (see an arrow A23) received from the host device 10, the volume data temporarily stored in the disk device 11 is written in the new virtual tape device 30B (TVC 31B) (see an arrow A24). As described above, in data copying performed via the host device 10, data is copied from the old virtual tape device 30A to the new virtual tape device 30B by read processing and write processing.

In contrast, as illustrated in FIG. 11, in data copying according to the present embodiment, the new virtual tape device 30B (IDP 33B) gives a volume data read instruction using the functions as the mount instruction section 331, the unmount instruction section 332, the pseudo host function section 333, and the compression section 334 (see an arrow A25). In accordance with this instruction, volume data is read from the old virtual tape device 30A (TVC 31A) to the new virtual tape device 30B (see an arrow A26). Then, the read volume data is stored in the TVC 31B of the new virtual tape device 30B. As described above, in the data copying performed according to the present embodiment, volume data is not temporarily stored, and thus, data is copied from the old virtual tape device 30A to the new virtual tape device 30B by only read processing. Therefore, according to the present embodiment, in data copying, as compared to data copying performed via the host device 10, data migration processing from the old virtual tape device 30A to the new virtual tape device 30B is efficiently performed in a further reduced time.

The functions as a pseudo host device are provided in the IDP (device control section) 33 of the virtual tape device 30 (storage control apparatus 3) according to the present embodiment. When the virtual tape device 30 is changed, the old virtual tape device 30A (ICP 32A) and the new virtual tape device 30B (IDP 33B) are connected to one another via the FC cable 50 in order to perform data migration from the old virtual tape device 30A to the new virtual tape device 30B.

Thus, all of data pieces of logical volumes in the TVC 31A of the old virtual tape device 30A is copied to the TVC 31B of the new virtual tape device 30B without going through the physical tapes 211 or the host device 10. Thus, a series of mechanical tape operations are not performed in data migration processing, and also, temporary data storing in the disk device 11 of the host device 10 or the like is not performed. Therefore, data migration processing from the old virtual tape device 30A to the new virtual tape device 30B is efficiently performed in a short time (1 to 2 days).

According to the present embodiment, all of desired data pieces (all of logical volumes) are copied to the TVC 31B by a single data migration operation. Therefore, a customer (system user) performs data migration operation without selecting target logical volumes to which on-cache processing is to be performed and selecting target logical volumes to which preload job is to be performed.

Other Embodiments

The first embodiment has been described above, but the present disclosure is not limited to the specific embodiment but various modification and changes may be made to implement the first embodiment without departing from the scope of the disclosure.

In the first embodiment, a case in which the physical storage device is the tape library device 20, 20A, 20B employing a physical tape (magnetic tape) as a physical volume has been described, but the present disclosure is not limited thereto. The physical volume may be a medium, such as, for example, an HDD, an SSD, a flexible disk, a compact disc (CD) such as a CD-ROM, a CD-R, a CD-RW, and the like, a digital versatile disc (DVD) such as a DVD-ROM, a DVD-RAM, a DVD-R, a DVD-RW, a DVD+R, a DVD+RW, and the like, a Blu-ray disk, and the like.

In the above-described embodiment, a case in which the virtual storage device is a virtual tape device and the logical volume is a virtual tape has been described, but the present disclosure is not limited thereto.

A computer (including a CPU, an information processing unit, and various terminals) executes a predetermined application program (storage control program), and thereby, all or some of the functions as the mount instruction section 331, the unmount instruction section 332, the pseudo host function section 333, and the compression section 334 which have been described is realized.

The above-described application program is provided in a form recorded in a computer-readable recording medium, such as, for example, an HDD, an SSD, a flexible disk, a CD (a CD-ROM, a CD-R, a CD-RW, and the like), a DVD (a DVD-ROM, a DVD-RAM, a DVD-R, a DVD-RW, a DVD+R, a DVD+RW, and the like), a Blu-ray disk, and the like. In such a case, a computer reads the program from the recording medium, transfers the program to an internal storage device or an external storage device to store the program, and then, uses the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
a memory; and
a processor coupled to the memory and the processor configured to
store, during a normal operation mode, first data as a first logical volume in a storage section of a first virtual storage device, the first data being transmitted and received between a first host device and a physical storage device, the physical storage device storing data in a physical volume, the first virtual storage device being connected to the physical storage device during the normal operation mode,
serve, during a data migration mode, as a pseudo host device connected to a second virtual storage device, by instructing the second virtual storage device to mount a second logical volume, accessing the second virtual storage device to read out decompressed second data of the second logical volume stored in the second virtual storage device, and compressing the read out decompressed second data, the first virtual storage device being connected to the second virtual storage device during the data migration mode and the decompressed second data being read out of the second logical volume stored in the second virtual storage device without being transmitted through the physical storage device or the first host device,
format the compressed second data and store the formatted second data in the storage section as a single logical volume, and
continuously compress the read out second data and format the compressed second data until an end of data block is read and then store the formatted second data as the single logical volume after the end of data block has been read.

2. The storage control apparatus according to claim 1, wherein the processor is configured to
give, after the second data of the second logical volume is read out, the second virtual storage device an unmount instruction to unmount the second logical volume.

3. The storage control apparatus according to claim 1, further comprising:
a device control section configured to be connected, during the normal operation mode, to the physical storage device so as to control the physical storage device,
wherein the device control section includes the processor.

4. The storage control apparatus according to claim 3, wherein
the first virtual storage device is connected, during the data migration mode, to the second virtual storage device by connecting the device control section to a host interface control section in the second virtual storage device, the host interface control section being configured to be connected to a second host device during the normal operation mode so as to control an interface with the second host device.

5. The storage control apparatus according to claim 4, wherein
the device control section is connected to the host interface control section via a fibre channel.

6. The storage control apparatus according to claim 1, wherein the first logical volume is included in a first virtual tape device corresponding to the physical storage device and the second logical volume is included in a second virtual tape device corresponding to a physical tape device.

7. A non-transitory computer-readable recording medium having stored therein a program for causing a computer to execute a process, the process comprising:
storing, during a normal operation mode, first data as a first logical volume in a storage section of a first virtual storage device, the first data being transmitted and received between a first host device and a physical storage device, the physical storage device storing data in a physical volume, the first virtual storage device being connected to the physical storage device during the normal operation mode;

serving, during a data migration mode, as a pseudo host device connected to a second virtual storage device by instructing the second virtual storage device to mount a second logical volume, accessing the second virtual storage device to read out decompressed second data of the second logical volume stored in the second virtual storage device, and compressing the read out decompressed second data, the first virtual storage device being connected to the second virtual storage device during the data migration mode and the decompressed second data being read out of the second logical volume stored in the second virtual storage device without being transmitted through the physical storage device or the first host device;

formatting the compressed second data and storing the formatted second data of the second logical volume in the storage section as a single logical volume; and continuously compressing the read out second data and formatting the compressed second data until an end of data block is read and then storing the formatted second data as the single logical volume after the end of data block has been read.

8. The non-transitory computer-readable recording medium according to claim 7, the process further comprising:

giving, after the second data of the second logical volume is read out, the second virtual storage device an unmount instruction to unmount the second logical volume.

9. A storage control method comprising:

storing by a storage control apparatus, during a normal operation mode, first data as a first logical volume in a storage section of a first virtual storage device, the first data being transmitted and received between a first host device and a physical storage device, the physical storage device storing data in a physical volume, the first virtual storage device being connected to the physical storage device during the normal operation mode;

serving, during a data migration mode, as a pseudo host device connected to a second virtual storage device by instructing the second virtual storage device to mount a second logical volume, accessing the second virtual storage device to read out decompressed second data of the second logical volume stored in the second virtual storage device, and compressing the read out decompressed second data, the first virtual storage device being connected to the second virtual storage device during the data migration mode and the decompressed second data being read out of the second logical volume stored in the second virtual storage device without being transmitted through the physical storage device or the first host device;

formatting the compressed second data and storing the formatted second data of the second logical volume in the storage section as a single logical volume; and continuously compressing the read out second data and formatting the compressed second data until an end of data block is read and then storing the formatted second data as the single logical volume after the end of data block has been read.

10. The storage control method according to claim 9, further comprising:

giving, after the second data of the second logical volume is read out, the second virtual storage device an unmount instruction to unmount the second logical volume.

* * * * *